Jan. 24, 1956     I. KARLIN     2,732,090
ELECTRICAL CONNECTION BOX
Filed Sept. 8, 1950     2 Sheets-Sheet 1
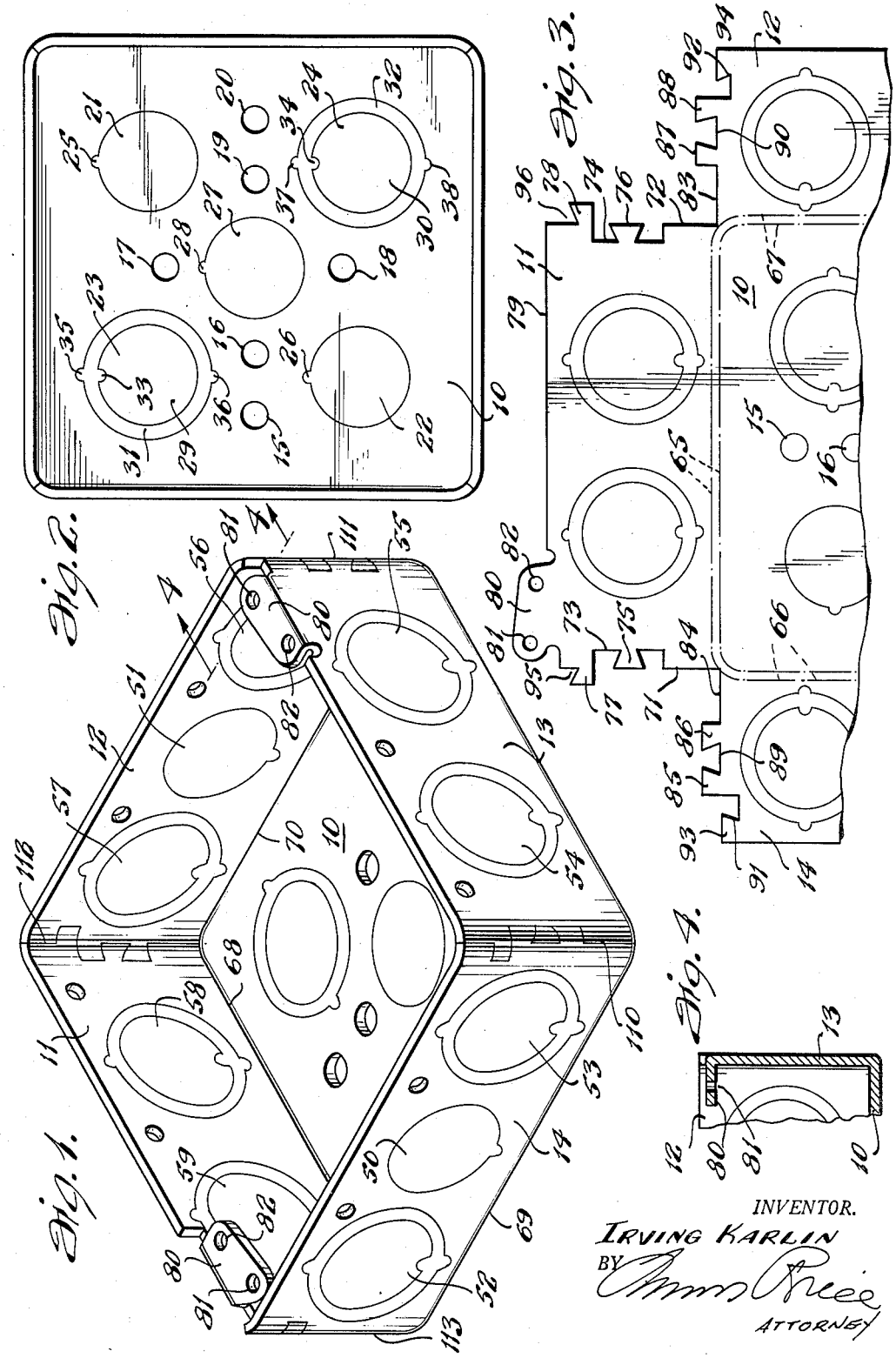
INVENTOR.
IRVING KARLIN
BY
ATTORNEY Jan. 24, 1956     I. KARLIN     2,732,090
ELECTRICAL CONNECTION BOX
Filed Sept. 8, 1950     2 Sheets—Sheet 2
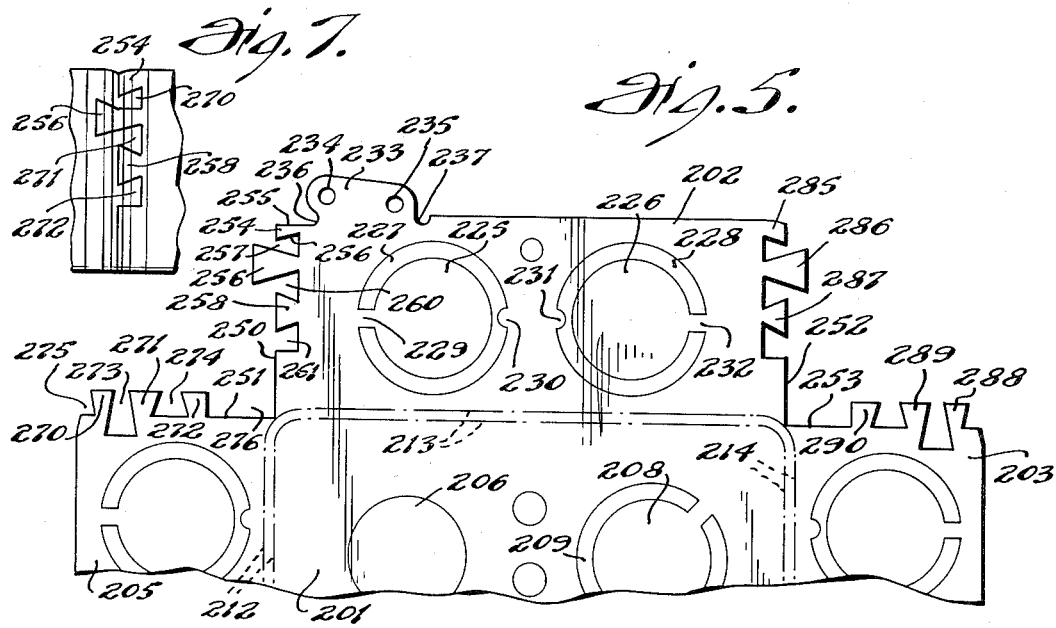
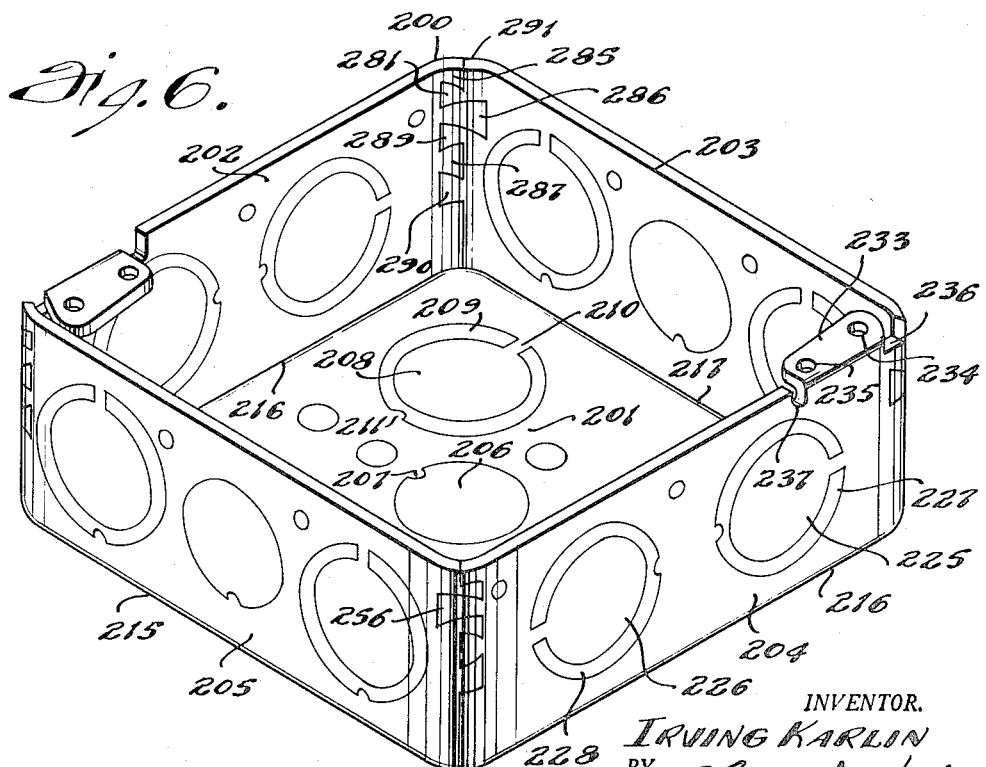
INVENTOR.
IRVING KARLIN ALPHA# United States Patent Office 2,732,090
Patented Jan. 24, 1956

2,732,090
ELECTRICAL CONNECTION BOX
Irving Karlin, Brooklyn, N. Y.

Application September 8, 1950, Serial No. 183,776

2 Claims. (Cl. 220—3.2)

This invention relates to an electrical connection box and it particularly relates to an outlet or junction box.

The present invention particularly relates to outlet boxes, junction boxes, switch boxes and the like and the general objects of the invention are to provide a box of this nature which will be of strong, durable but light construction and which can be made each from a single piece of sheet metal by automatic means and therefore be produced at relatively low cost.

Another object is to provide a novel integral one piece outlet, junction or switch box or the like, adaptable to practically any wiring or structural conditions, strong enough to form a chandelier or fixture support, yet relatively light in weight, of a permanent durable character and of its simple one piece structure and of relatively inexpensive production.

It is a further object of the present invention to provide a novel electric outlet box which may be inexpensively manufactured out of sheet metal and most readily formed into a box structure with a minimum of machine or manual operations and with a maximum of economy.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

The box is of substantially square outline with a base wall and four integrally connected upstanding side walls, opposite walls being of similar construction and the four walls being locked together at the corners by dovetails and interlocking recesses carried by the ends of the walls.

According to one embodiment of the present invention, to form a one piece blank for the box in one operation, with integral base and four side wall or wing members, and then thereafter form the final box structure by folding up the side wall members together so that they will come together and be substantially permanently united.

This is desirably accomplished by forming a dovetail structure in the edges or sides of the side walls which will match with one another as the side walls are folded upwardly away from the bottom wall and in engagement with each other.

Desirably, the mounting lugs for cover attaching screws at the top of the box for the cover thereof are also formed integrally with the box.

The knockouts may be so provided that there may be either a larger or smaller opening. A central knockout may be provided inside an annular knockout enclosing said central knockout. The annular knockout is held in position to the wall structure by two diametrically opposite attachment tabs, while the central knockout is provided with only one attachment tab to the annular knockout.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims appended hereto.

In the drawings wherein like reference characters denote corresponding parts throughout the several views:

Fig. 1 is a top perspective view of a completed junction box according to one embodiment of the present invention.

Fig. 2 is a bottom plan view of the interior of the junction box of Fig. 1, upon a smaller scale than Fig. 1.

Fig. 3 is a fragmentary end plan view of part of the blank from which the junction box may be folded.

Fig. 4 is a fragmentary vertical transverse sectional view upon the line 4—4 of Fig. 1.

Fig. 5 is a fragmentary view of an end of a blank similar to Fig. 3, showing an alternative form of construction in which the dovetails are designed to hold the ends of the box more firmly together.

Fig. 6 is a top perspective view similar to Fig. 1, showing the box formed out of the blank of Fig. 5.

Fig. 7 is a fragmentary corner elevational view of one of the corners of the box of Fig. 5.

Referring to Fig. 1, there is shown a base 10 and the side walls 11, 12, 13 and 14.

The bottom wall 10 is provided with a series of openings 15, 16, 17, 18, 19 and 20 and with the single opening knockouts 21 and 22 and the double opening knockouts 23 and 24.

The single knockouts 21 and 22 have the attachment tabs 25 and 26 while the central knockout 27 has an attachment tab 28. The double knockouts 23 and 24 have central knockout portions 29 and 30 and outside knockout portions 31 and 32. The inside knockout portions have single attachment ears 33 and 34 while the outside knockout portions 31 and 32 have double attachment ears 35, 36, 37 and 38.

In the side walls there are also single knockouts 50 and 51 and double knockouts 52, 53, 54, 55, 56, 57, 58 and 59, which are of the same general construction of those already described in connection with the bottom wall 10.

In the blank as shown in Fig. 3, there are provided fold lines 65, 66 and 67 which subsequently will form the edges 68 and 69 and 70 in Fig. 1.

At the side edges 71 and 72 of the wall 11 there are provided the recesses 73 and 74 with an outwardly projecting dovetail tab 75 and 76.

Above the recesses 73 and 74 are the outwardly projecting dovetail elements 77 and 78 just below the upper edge 79 of the wall 11.

Projecting away from the top edge 79 is the ear 80 having openings 81 and 82, which is designed to be folded down in the position as shown in Fig. 1 after completion of the assembly.

The corresponding edges 83 and 84 of the side walls 12 and 14 have the outwardly projecting half dovetail portions 85, 86, 87 and 88 with a central recess 89 and 90 to receive the dovetail tongue 75 and 76 of the wall 11.

There are also provided the half dovetail recesses 91 and 92 to receive the half dovetail portions 77 and 78 of the side wall 11. The half dovetails 93 and 94 to fit into the spaces 95 and 96 above the half dovetails 77 and 78.

When the sides 11, 12, 13 and 14 are folded together, they will be rounded and dovetailed together, as is best indicated at the edges 110, 111, 112 and 113.

This arrangement provides for practically any desired combination of wiring conduits.

The square cornered construction of the box provides plenty of room for two to five knockouts in each side, allowing for a total of ten large size and five of the smaller size knockouts.

While there has been herein described a preferred form of the invention, it should be understood that the same may be altered in details and in relative arrangement of parts within the scope of the appended claims.

The dovetail locking construction of the present invention enables the sides of the box to be folded and locked together at the same time, and the combination of full and half dovetails fitting into the corresponding recesses on the adjacent walls resist opening by diagonal stresses, or stresses directed parallelly along the walls. The corners of the final box are locked against separation in all directions.

In the structure of Figs. 5, 6 and 7, the electrical connection or square box 200 has a base or bottom 201 in the side walls 202, 203, 204 and 205.

The bottom wall 201 is provided with the single knock-out 206 with the tab 207 and the double knock-out 208 with the annulus 209 and the tabs 210 and 211.

The base 201, as shown in Fig. 5, when stamped out is provided with the fold lines 212, 213 and 214 to form the lower corners or edges 215, 216 and 217, respectively.

Formed integrally with the base 201 in the blank of Fig. 5 are the side walls 202, 203 and 205.

The side walls 202 and 204 carry the double knock-outs 225 and 226 having the annular portions 227 and 228 and the tabs 229, 230, 231 and 232.

The walls 202 and 204 are also provided with the extensions or ears 233 having the openings 234 and 235, which have the side cut-outs 236 and 237 to enable them to be folded inwardly to the position of Fig. 6 from the position as shown in Fig. 5 more readily.

The important feature of the present invention is the arrangement of the interlocking dovetail-shaped projections and recesses which are shown on the blank of Fig. 5 at the edges 250, 251, 252 and 253 of the walls 202, 203 and 205 of Fig. 5.

It will be noted by reference to Fig. 5 that on the edge 250 of the wall 202 there is provided a short dovetail 254 having a flat top side 255 and an oblique bottom side 256.

The next dovetail 256 is separated by the space 257 from the top dovetail 254 and the dovetail 256 extends substantially beyond the edge 250 and around the corner of the box when formed as shown in Fig. 6.

The dovetail 256 has two outwardly converging oblique side edges. The dovetail 258 next below the dovetail 256 only extends to the edge 250—that is up to the corner of the box of Fig. 6—without extending past the corner. On either side of the dovetail 258 are the recesses 260 and 261.

The cooperating edge 251 of the wall 205 has the dovetails 270, 271 and 272 separated by the wedge-like recesses 273 and 274.

The recess 273 extends across the corner of the box whereas the recess 274 and the recess 275 and 276 on either side of the dovetails 270, 271 and 272 will terminate at the edge 251 or at the corner when the blank of Fig. 5 is folded into a box.

When the dovetailed arrangement on the edges 250 and 251 are folded together to give the structure as indicated upon Fig. 7, it will be noted that the dovetail 254 will lock with the dovetail 270 adjacent the upper side of the corner, as shown in Fig. 7, to prevent separation at the corner at the weakest point of connection. The dovetails 256, 258, 271 and 272 are also locked together to strengthen the balance of the corner of the box.

On the other edges 252 and 253 the dovetails 285, 286 and 287 will similarly engage and form a strong connection with the dovetails 288, 289 and 290 when the walls 202 and 203 are formed together to form a corner 291, as indicated in Fig. 6.

The connection between the dovetails 281 and 285 is such that the upper corner of the box will be strongly reinforced and prevented from separation.

The structure as shown in Figs. 5, 6 and 7 will assure the box against both lateral pull in the direction of the wall as well as downwardly, rotational pull, tending to pull the walls back into the flat position of Fig. 5 from the box position of Fig. 6. A very strong construction will thus be formed which will resist normal stresses and which will assure a box construction of maximum strength.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A non-separating corner one-piece rectangular integral junction box having a rectangular base and rectangular sides integral with said base perpendicular to the base with four 90° quarter cylindrical rounded corners with the adjacent side edges of each wall forming a 45° eighth cylindrical portion of each rounded corner and said 45° cylindrical rounded edges having interlocking dovetail connections, said box being of the type in which the rectangular base and the rectangular sides are stamped as a single flat blank out of one sheet of metal and the sides are then folded upwardly to a position at right angles to the base with the adjacent side edges of said rectangular base being rounded into said non-separating corners, said corners consisting of alternating interlocking dovetail projections and dovetail recesses limited to and extending transversely across and around said quarter cylindrical rounded corners, the dovetail projections adjacent the base of the box extending to and terminating at the center of the rounded corner and the projections adjacent the edge of the box extending around the entire corner.

2. The box of claim 1 in which the end dovetail projections are half dovetails.

References Cited in the file of this patent

UNITED STATES PATENTS

| 497,205 | Pia | May 9, 1893 |
| 1,428,195 | Wahl et al. | Sept. 5, 1922 |
| 1,625,882 | Converse | Apr. 26, 1927 |
| 2,362,817 | Haycock | Nov. 14, 1944 |
| 2,544,232 | Kennedy | Mar. 6, 1951 |
| 2,625,288 | Clark et al. | Jan. 13, 1953 |

FOREIGN PATENTS

| 21,881 | Great Britain | 1913 |